(12) United States Patent
Fujimoto

(10) Patent No.: US 9,938,002 B2
(45) Date of Patent: Apr. 10, 2018

(54) AIRFRAME STABILIZATION MECHANISM FOR VERTICAL TAKEOFF AND LANDING TRANSPORT PLANE

(71) Applicant: Hiromichi Fujimoto, Beppu (JP)

(72) Inventor: Hiromichi Fujimoto, Beppu (JP)

( * ) Notice: Subject to any disclaimer, the term of this patent is extended or adjusted under 35 U.S.C. 154(b) by 29 days.

(21) Appl. No.: 14/413,117

(22) PCT Filed: Jul. 10, 2013

(86) PCT No.: PCT/JP2013/068893
§ 371 (c)(1),
(2) Date: Jan. 6, 2015

(87) PCT Pub. No.: WO2014/010634
PCT Pub. Date: Jan. 16, 2014

(65) Prior Publication Data
US 2015/0191243 A1 Jul. 9, 2015

(30) Foreign Application Priority Data

Jul. 12, 2012 (JP) .................................. 2012-156816
Aug. 17, 2012 (JP) .................................. 2012-181074

(51) Int. Cl.
*B64C 29/00* (2006.01)
*B64C 17/00* (2006.01)
*B64C 5/02* (2006.01)
*B64C 5/12* (2006.01)
*B64C 5/10* (2006.01)
*B64C 7/02* (2006.01)

(52) U.S. Cl.
CPC ................ *B64C 17/00* (2013.01); *B64C 5/02* (2013.01); *B64C 5/10* (2013.01); *B64C 5/12* (2013.01); *B64C 7/02* (2013.01); *B64C 29/0033* (2013.01)

(58) Field of Classification Search
CPC ........ B64C 29/02; B64C 29/0033; B64C 5/02; B64C 7/02; B64C 17/00
See application file for complete search history.

(56) References Cited

U.S. PATENT DOCUMENTS

| 3,141,633 | A | * | 7/1964 | Mackay | .............. B64C 29/0033 |
| | | | | | 244/7 C |
| 3,335,977 | A | * | 8/1967 | Meditz | ...................... B64C 3/42 |
| | | | | | 244/12.4 |
| 4,613,097 | A | | 9/1986 | Jordan | |
| 5,758,844 | A | * | 6/1998 | Cummings | ......... B64C 29/0033 |
| | | | | | 244/12.4 |
| 2005/0133662 | A1 | | 6/2005 | Magre | |

FOREIGN PATENT DOCUMENTS

| JP | S39-002584 | | 3/1964 |
| JP | S47-048159 | | 12/1972 |
| JP | S59-059596 | A | 4/1984 |
| JP | S62-221998 | A | 9/1987 |
| JP | H05-193583 | A | 8/1993 |

* cited by examiner

*Primary Examiner* — Jessica B Wong

(57) ABSTRACT

A vertical takeoff and landing transport plane is characterized in that a structure formed in the top-bottom direction of an airframe penetrates a rear structure of the vertical takeoff and landing transport plane in order to let a tailwind escape, and characterized by comprising, in the rear structure of the vertical takeoff and landing transport plane, a device for generating thrust rearward behind the rear on the top side of the airframe from the bottom of the airframe.

2 Claims, 12 Drawing Sheets

PRIOR ART

PRIOR ART

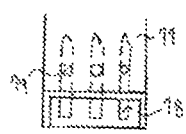
FIG.15A
FIG.15B
FIG.16A    FIG.16B    FIG.16C    FIG.16D 
FIG.17A
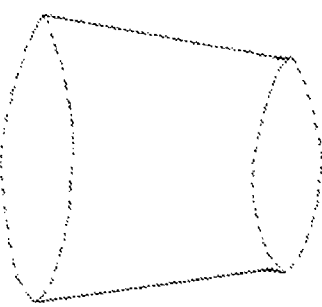
FIG.17B
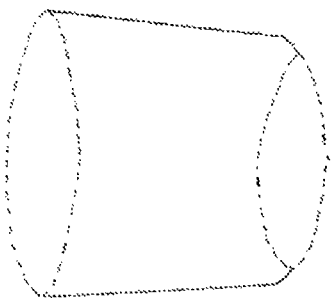

US 9,938,002 B2

AIRFRAME STABILIZATION MECHANISM FOR VERTICAL TAKEOFF AND LANDING TRANSPORT PLANE

CROSS REFERENCE TO RELATED APPLICATIONS

This patent application is a U.S. national stage application under 35 U.S.C. § 371 of International Patent Application No. PCT/JP2013/068893 filed on Jul. 10, 2013, which claims the benefit of foreign priority to Japanese Patent Application No. JP 2012-156816 filed on Jul. 12, 2012, and to Japanese Patent Application No. JP 2012-181074 filed on Aug. 17, 2012. The International Application was published in Japanese on Jan. 16, 2014, as International Publication No. WO 2014/010634 A1 under PCT Article 21(2).

BACKGROUND OF THE INVENTION

The present invention relates to a transport plane which performs a vertical takeoff and landing, and relates also to that which can be manufactured only when there is permission granted by the United States government where the airframe to which an airplane constituent component of the present invention belongs was originally manufactured and by the Japanese government which is an allied nation of the United States and which is a country to which the inventor's nationality belongs.

FIG. 1(A) shows a direction changing mode of US Forces' vertical takeoff and landing transport plane, Osprey (Osprey), in FIG. 1(B), where the plane is capable of performing a forward movement when a propeller (2) and an engine (3) are faced obliquely upward relative to an airframe (1), performing a helicopter-like operation in a vertical takeoff and landing mode when the engine is faced upward as indicated by an arrow, and performing flying at cruising speed and in a cruising range like an airplane in a fixed wing mode where the propeller is faced forward when the engine is faced forward as indicated by an arrow. In the foregoing figure, (LX) denotes "a line passing through a front-back direction of an aircraft being a front-back direction line of an aircraft" according to claim 1, and (LZ) denotes "a line in a direction perpendicular to the front-back direction line of an aircraft and the left-right direction line of an aircraft being a top-bottom direction line of an aircraft" according to claim 1.

FIG. 1(B) shows an example of a simplified diagram where the conventional vertical takeoff and landing transport plane is seen from below. A lower-side door (4) that opens downward and that is for loading and unloading goods and allowing a passenger to board and descend is connected by a hinge structure (4') (see FIG. 14) with a lower part of an airframe (1) and is linked to the airframe by a part that is swung in a direction parallel to the left-right direction line around an area near the hinge structure. A door upper surface, which is a door that opens and closes, is positioned and obliquely fixed at a side toward an area near an elevator (1') when the aircraft is cruising.

Further, the lower-side door (4) in FIG. 1(B) corresponds to a "lower-side door/lamp" in a figure of a rear fuselage door on page 23 of Non Patent Document 6.

Numeral (4) in FIG. 1(B) is a "door for entrance and exit near a rear part of a fuselage of an airframe of an aircraft, through which goods are loaded and unloaded and a passenger is allowed to board and descend" according to claim 1, (1') is "an area near an elevator at a rear part of a horizontal tail" according to claim 1, (5) is an airframe rear part constituent part positioned in "a region in an airframe rear part from an area near the door for entrance and exit of an airframe to an area near an elevator at a rear part of a horizontal tail" according to claim 1, FIG. 1(B) shows an airframe lower side surface obtained when (5) is seen from a lower side of an airframe, and (LY) denotes "a line being perpendicular to the front-back direction line of an aircraft and passing through a left-right direction of a main wing being a left-right direction line of an aircraft" according to claim 1. In the figure, a vertical takeoff and landing transport plane is shown where there is a distance in the airframe rear part from a connection part between the door for entrance and exit and the fuselage of an airframe to an area near the horizontal tail of an airframe.

FIG. 1(C) is obtained when an area near (5) in FIG. 1(B) is seen from its side, where (1') is the cross section near the elevator positioned at the back of the horizontal tail and (4) is a door that is swung so as to make an upward and downward movement around a rotation shaft connected to the airframe (1) in an arrow direction.

FIG. 1(D) is a diagram obtained when the cross section of the airframe (1) cut along a dotted line drawn from the top surface (X) in FIG. 1(C) to the bottom surface (X') is seen from the horizontal tail side, and (5) is the cross section near a part dividing the top surface and the bottom surface of the airframe.

FIG. 1(E) is a cross-sectional view obtained when FIG. 1(D) is moved until a front surface of the airframe can be seen, where a space (6) is formed between (5) and the top surface of the door (4).

FIG. 1(F) is a cross-sectional view obtained when FIG. 1(E) is seen from its side, where there is a cross section (1) of an airframe, a cross section (1') of an elevator, and a cross section (1") of an area near the elevator, in a front-back direction of the cross section (5).

When a wind blows in an arrow direction indicated in FIG. 1(F), a rear part of the airframe may easily lift.

On pages 102 to 109 of Non Patent Document 5, a diagram and a mechanism of a hydraulic system are shown which uses Pascal's principle, on pages 198 to 201 of Non Patent Document 3, a diagram and a mechanism of a hydraulic system for a steering system of an airplane are shown which uses Pascal's principle, and on page 94 of Non Patent Document 4, a simplified diagram of a hydraulic system of a landing device of an airplane, and on page 83, a simplified diagram of a steering system of an airplane are shown. In the following paragraphs as described herein, a rod that performs reciprocating motion for expanding and contracting an actuator (drive source for operating a machine) of a hydraulic system is combined with a (guiding) part for containing the rod therein so that a sliding movement can be performed therealong to simply describe a hydraulic cylinder.

By the hydraulic cylinder, a boom or an arm in FIG. 6-1 on page 138 in Non Patent Document 10 and an arm having a hinge structure with an arm as shown in a diagram and a photo on pages 128 and 129 in Non Patent Document 3 may be operated.

The hydraulic cylinder is also used for opening/closing a cargo door, etc., of the American vertical takeoff and landing transport plane, Osprey, and it is also possible to recognize the hydraulic cylinder in a diagram on page 23 in Non Patent Document 6, a photo on page 45 of the same literature, in FIG. 6-1 on page 138 in Non Patent Document 10, and the like.

Types of robot arms are described on page 45 in Non Patent Document 1, where an example of expansion/contraction operation, swing operation, and movement operation is shown.

Non Patent Document 1: Zukai zatsugaku robotto (Illustrative Encyclopedic Knowledge "Robot"), supervising editor by Tatsuo ARAI, Natsumesha CO., LTD.

Non Patent Document 2: Zukai nyumon yokuwakaru saishin yuatsu/kuukiatsu no kihon to shikumi (Beginner's Illustrative Book, Easy to Understand Basics and Mechanisms of the Latest Oil Pressures and Air Pressures), Toshio SAKAMOTO, Tadanori NAGAKI, SHUWA SYSTEM CO., LTD.

Non Patent Document 3: Purogaoshieru hikoki no mekanizumu (Airplane Mechanisms Taught by a Professional), supervising editor by Shinji SUZUKI, Natsumesha CO., LTD.

Non Patent Document 4: Purogaoshieru hikoki no subetegawakaru hon (Book on Everything to Know about Airplanes, Taught by Professional), supervising editor by Shinji SUZUKI, Natsumesha CO., LTD.

Non Patent Document 5: Tokoton yasashii kikai no hon (Very Easy Book about Machines), Keiichi ASAHINA and Sumiyoshi MITA, NIKKAN KOGYO SHIMBUN, LTD.

Non Patent Document 6: V-22 Osprey, IKAROS PUBLICATIONS LTD.

Non Patent Document 7: Zukai nyumon yokuwakaru saishin bearingu no kihon to shikumi (Beginner's Illustrative Book, Easy to Understand "Basics and Mechanisms of the Latest Bearings"), JTEKT "Bearing Introductory Book," Editing Committee, SHUWA SYSTEM CO., LTD.

Non Patent Document 8: Zukai nyumon yokuwakaru saishin denki jidosha no kihon to shikumi (Beginner's Illustrative Book, Easy to Understand Basics and Mechanisms of Latest Electric Vehicles), Naotsugu MIHORI, SHUWA SYSTEM CO., LTD.

Non Patent Document 9: Tokoton yasashii mota no hon (Very Easy Book about Motor), Kinji TANIKOSHI, NIKKAN KOGYO SHIMBUN, LTD.

Non Patent Document 10: Etokidewakaru ryutaikogaku (Understanding with Pictures, Hydraulic Engineering), Katsuyuki ADACHI and Kazuhito SUGANO, Ohmsha, Ltd.

Non Patent Document 11: "Ryutaikogaku" no kihon (Basics of "Hydraulic Engineering"), Tatsuo KOMINE, SB Creative Corp.

Non Patent Document 12: Tokoton yasashii seigyo no hon (Very Easy to Understand Book about Controls), Kazuo KADOTA, NIKKAN KOGYO SHIMBUN, LTD.

Non Patent Document 13: F-22 wa naze saikyo to iwarerunoka (Why the F-22 Is Said to Be the Strongest), Yoshitomo AOKI, SB Creative Corp.

Non Patent Document 14: Kokukogaku no hon (Book about Aeronautical Engineering), Yuuichi TAKAGI, Ryoma KOZUKA, Takehiro MATSUSHIMA, Yasuyuki TANIMURA, NIKKAN KOGYO SHIMBUN, LTD.

Non Patent Document 15: Tokoton yasashii uchu roketto no hon (Very Easy to Understand Book about Space Rockets), Yasunori MATOGAWA, NIKKAN KOGYO SHIMBUN, LTD.

Non Patent Document 16: Hajimeteno uchu kogaku (Beginner's Space Engineering), Koichi SUZUKI, Morikita Publishing Co., Ltd.

Non Patent Document 17: Saisentan denchi to zairyo (The Most Advanced Batteries and Materials), The Society of Polymer Science, Japan (compilation), KYORITSU SHUPPAN CO., LTD.

Non Patent Document 18: Zukai nyumon yokuwakaru saishin rea metaru no kihon to shikumi (Beginner's Illustrative Book, Easy to Understand Basics and Mechanisms of Latest Rare Metals), Kazuaki TANAKA, SHUWA SYSTEM CO., LTD.

Non Patent Document 19: Zusetsu kikai yogo jiten (Illustrative Dictionary of Machine-Related Terms), Jikkyo Shuppan Co., Ltd.

Non Patent Document 20: Jet Engines, Koichi SUZUKI, Morikita Publishing Co., Ltd.

SUMMARY OF INVENTION

When parts such as an elevator located at the back of a horizontal tail and a flaperon located on a main wing which provides lift to an airframe cannot easily generate lift during a low-speed flight, conventional vertical takeoff and landing transport planes are in danger of crashing if the center of gravity of the airframe shifts forward by the vertical takeoff and landing transport planes catching a tailwind or the like, the falling direction of the airframe and the direction of traveling using a propeller become a direction toward the ground, and the distance from the ground becomes such a short distance that the airframe cannot be put back in place.

SUMMARY OF THE INVENTION

In order to achieve the above object, one of the solutions of a rear structure of the vertical takeoff and landing transport plane of the present invention is a vertical takeoff and landing transport plane, comprising: a line passing through a front-back direction of an aircraft being a front-back direction line of an aircraft, a line being perpendicular to the front-back direction line of an aircraft and passing through a left-right direction of a main wing being a left-right direction line of an aircraft, and a line in a direction perpendicular to the front-back direction line of an aircraft and the left-right direction line of an aircraft being a top-bottom direction line of an aircraft, where the vertical takeoff and landing transport plane has a door for entrance and exit near a rear part of a fuselage of an airframe of an aircraft, through which goods are loaded and unloaded and a passenger is allowed to board and descend, is structured to have a distance from a connection part between the door and the airframe to near a horizontal tail of an airframe, is capable of performing a forward movement while a propeller and an engine are faced obliquely upward relative to the airframe, performing an operation in a vertical takeoff and landing mode when the engine is faced upward, and flying in a fixed wing mode in which the propeller is faced forward when the engine is faced forward, wherein a rear structure of the vertical takeoff and landing transport plane is characterized by being configured by: in a region in an airframe rear part from an area near the door for entrance and exit of an airframe to an area near an elevator at a rear part of a horizontal tail, a through-hole structure of the airframe rear part, having a hole penetrating from an airframe bottom surface to an airframe top surface; a thrust generation device having a rotary moving blade for exhausting air in a direction from a lower side to an upper side of an airframe and having a size allowing a part or all of the device to be inserted in said through-hole structure in the airframe rear part; and an actuator mechanism: where the actuator mechanism has a size allowing a part or all of the actuator mechanism to be housed in said through-hole of the airframe rear part; where a rotation shaft mechanism having a rotation shaft in parallel or approximately parallel to the left-right direction line of an aircraft is configured both in an area near said through-hole structure of the airframe rear part and said thrust generation device; and where one end is linked to the rotation shaft mechanism in an area near said through-hole structure in the airframe rear part and the other end is linked to the rotation shaft mechanism of said thrust generation device.

One of the solutions of a thrust generation device of the present invention is that in the thrust generation device according to paragraph 0017, characterized by comprising: a rotary moving blade for exhausting air; and a box-shaped nacelle having a hole-structured case, which surrounds said rotary moving blade in a circumferential direction and penetrates from a front side of the rotary moving blade to a rear side thereof, for suctioning air or compressing or exhausting air, where the box-shaped nacelle penetrates from a side of the airframe bottom surface to a rear side of the airframe top surface, for surrounding and supporting said case.

One of the solutions of a thrust generation device of the present invention is a thrust generation device, wherein the hole-structured case of the thrust generation device according to paragraph 0018 is a hole-structured case in which a plurality of cases are linked in a front-back direction of an air flow, and comprises: a linked case structure having a ring-shaped rotation shaft mechanism, in which a cavity is formed for ventilation, for swing operation in clockwise and counterclockwise directions, where the cases on both sides in the front-back direction, positioned in a particular location in the plurality of linked cases, are linked by linkage between a hollow ring installed in one case and a linkage ring that serves as a bearing for guiding said ring installed in the other case; and a box-shaped nacelle which surrounds said linked case structure together with a plurality of cases surrounded or divided for each divided case and penetrates from the side of the airframe bottom surface to the rear side of the airframe top surface.

One of the solutions of a thrust generation device of the present invention is a thrust generation device, characterized by comprising, in the case in the nacelle according to paragraph 0018 or 0019, or inside the case positioned at the back of the moving blade for exhausting air, or in an area near an exhaust hole in a rear part of said box-shaped nacelle, a nacelle having a deflection plate which has a rotation shaft having a vertical or oblique angle relative to the front-back direction line of an aircraft and which is for changing a direction in a direction such as a left-right direction of an aircraft or a top-bottom direction of an aircraft.

One of the solutions of a thrust generation device of the present invention is a thrust generation device, characterized by comprising: a lid for opening/closing an opening capable of covering a part or all of an opening which includes an opening of an air intake port or an opening of an exhaust port of the nacelle according to paragraph 0018, 0019, or 0020; and a linkage mechanism between said lid for opening/closing an opening and said box-shaped nacelle, having a guide mechanism or an actuator mechanism for a sliding operation or a swing operation of said lid for opening/closing an opening in an up-down direction, a front-back direction, or a left-right direction.

One of the solutions of a rear structure of the vertical takeoff and landing transport plane of the present invention is a rear structure of the vertical takeoff and landing transport plane, comprising: a through-hole structure penetrating from an airframe top surface to an airframe bottom surface, in an airframe mid rear part positioned at a front side relative to the through-hole structure in the airframe rear part according to paragraph 0017 and positioned at a rear side relative to a main wing of the airframe, wherein the rear structure of the vertical takeoff and landing transport plane is characterized by being configured by: an opening/closing door for linking a rotation shaft in a direction in parallel or approximately parallel to a left-right direction line of an aircraft by a hinge structure provided in a rear direction of an aircraft and for partitioning and blocking a through-hole by the same or approximately the same size as that of said through-hole structure in the airframe mid rear part; and a linkage mechanism for linking an area near said through-hole structure and said opening/closing door by a rotation shaft in parallel or approximately parallel to a left-right direction line of an aircraft, where all or a part of the linkage mechanism is housed in said through-hole structure, and an actuator mechanism is provided for opening/closing in an up-down direction of an airframe front side of said opening/closing door.

One of the solutions of a structure for a rear door of a vertical takeoff and landing transport plane of the present invention is that in an opening/closing door, where the opening/closing door of an opening for entrance and exit according to paragraph 0017 is formed by a separate-type upper-side door and lower-side door, characterized by being configured by: an actuator mechanism for linear operation and for swing operation of said upper-side door configured by: a rotation shaft mechanism for said upper-side door, having a shaft in a direction in parallel or approximately parallel to a left-right direction line of an aircraft; and a rotation shaft mechanism having a shaft in a direction in parallel or approximately parallel to a left-right direction line of an aircraft, for linkage via a guide mechanism for sliding in a front-back direction of an aircraft, the guide mechanism being installed near a ceiling inside a fuselage of an aircraft, or for direct linkage to near the ceiling inside the fuselage of an aircraft.

One of the solutions of a rear structure of the vertical takeoff and landing transport plane of the present invention is a rear structure of an airframe, comprising a structure near a through-hole structure of an airframe rear part having a hole penetrating from the airframe bottom surface to the airframe top surface according to paragraph 0017, positioned in a region in an airframe rear part from an area near a rear part of a main wing to an area near an elevator at a rear part of a horizontal tail of an airframe of the vertical takeoff and landing transport plane, characterized by being configured by: an opening/closing door for partitioning and blocking, from the airframe top surface, a through-hole by the same or approximately the same size as that of the through-hole in an airframe rear part having: a sliding operation mechanism for sliding a door configuring the airframe top surface in a front-back direction of an aircraft; at a linkage part between said sliding operation mechanism and a door configuring the airframe top surface positioned at the back of said sliding operation mechanism, a linkage part for the doors configuring the divided airframe top surface, positioned at the back of said linkage part, and a linkage part between the door configuring the airframe top surface and an area near a horizontal plate configuration part of an aircraft, positioned at said rear side; a swing operation mechanism having a shaft parallel to a left-right direction line of an aircraft.

An operation described in paragraph 0017 is that one of the solutions of a rear structure of the vertical takeoff and landing transport plane of the present invention is a vertical takeoff and landing transport plane, comprising: a line passing through a front-back direction of an aircraft being a front-back direction line of an aircraft, a line being perpendicular to the front-back direction line of an aircraft and passing through a left-right direction of a main wing being a left-right direction line of an aircraft, and a line in a direction perpendicular to the front-back direction line of an aircraft and the left-right direction line of an aircraft being a top-bottom direction line of an aircraft, where the vertical takeoff and landing transport plane has a door for entrance and exit near a rear part of a fuselage of an airframe of an aircraft, through which goods are loaded and unloaded and a passenger is allowed to board and descend, is structured to have a distance from a connection part between the door and the airframe to near a horizontal tail of an airframe, is capable of performing a forward movement while a propeller and an engine are faced obliquely upward relative to the airframe, performing an operation in a vertical takeoff and landing mode when the engine is faced upward, and flying in a fixed wing mode in which the propeller is faced forward when the engine is faced forward, wherein a rear structure of the vertical takeoff and landing transport plane is characterized by being configured by: in a region in an airframe rear part from an area near the door for entrance and exit of an airframe to an area near an elevator at a rear part of a horizontal tail, a through-hole structure of the airframe rear part, having a hole penetrating from an airframe bottom surface to an airframe top surface; a thrust generation device having a rotary moving blade for exhausting air in a direction from a lower side to an upper side of an airframe and having a size allowing a part or all of the device to be inserted in said through-hole structure in the airframe rear part; and an actuator mechanism: where the actuator mechanism has a size allowing a part or all of the actuator mechanism to be housed in the through-hole of said airframe rear part; where a rotation shaft mechanism having a rotation shaft in parallel or approximately parallel to the left-right direction line of an aircraft is configured both in an area near said through-hole structure of the airframe rear part and said thrust generation device; and where one end is linked to the rotation shaft mechanism in an area near said through-hole structure in the airframe rear part and the other end is linked to the rotation shaft mechanism of said thrust generation device. Thus, it is possible to change the orientation of the thrust generation device of an aircraft by the shaft parallel to the left-right direction line of an aircraft to various up-down angles, and to install and move the installation position of the thrust generation device in various locations in an up-down direction.

An operation described in paragraph 0018 is the thrust generation device according to paragraph 0017, characterized by comprising: a rotary moving blade for exhausting air; and a box-shaped nacelle having a hole-structured case, which surrounds said rotary moving blade in a circumferential direction and penetrates from a front side of the rotary moving blade to a rear side thereof, for suctioning air or compressing or exhausting air, where the box-shaped nacelle penetrates from a side of the airframe bottom surface to a rear side of the airframe top surface, for surrounding and supporting said case. Thus, it is possible to change the direction of the exhaust of the exhaust port of the box-shaped thrust generation device covered with a nacelle, etc., which performs a circular operation in an up-down direction around the rotation shaft, etc., into various up-down angles.

An operation described in paragraph 0019 is a thrust generation device, wherein the hole-structured case of the thrust generation device according to paragraph 0018 is a hole-structured case in which a plurality of cases are linked in a front-back direction of an air flow, and comprises: a linked case structure having a ring-shaped rotation shaft mechanism, in which a cavity is formed for ventilation, for swing operation in clockwise and counterclockwise directions, where the cases on both sides in the front-back direction, positioned in a particular location in the plurality of linked cases, are linked by linkage between a hollow ring installed in one case and a linkage ring that serves as a bearing for guiding said ring installed in the other case; and a box-shaped nacelle which surrounds said linked case structure together with a plurality of cases surrounded or divided for each divided case and penetrates from the side of the airframe bottom surface to the rear side of the airframe top surface. Thus, it is possible to change the direction of the exhaust of the exhaust port of the box-shaped thrust generation device covered with a nacelle, etc., which performs a circular operation in a left-right direction around the rotation shaft, etc., into various left-right angles.

An operation described in paragraph 0020 is a thrust generation device, characterized by comprising, in the case in the nacelle according to paragraph 0018 or paragraph 0019, inside the case positioned at the back of the moving blade for exhausting air, or in an area near an exhaust hole in a rear part of said box-shaped nacelle, a nacelle having a deflection plate which has a rotation shaft having a vertical or oblique angle relative to the front-back direction line of an aircraft and which is for changing a direction into a direction such as a left-right direction of an aircraft or a top-bottom direction of an aircraft. Thus, in the box-shaped thrust generation device covered with a nacelle, etc., it is possible to change the direction of exhaust by the deflection plate for changing a direction of the air which is exhausted in the left-right direction, the up-down direction, etc., into various angles such as a left-right direction and an up-down direction.

An operation described in paragraph 0021 is a thrust generation device, characterized by comprising: a lid for opening/closing an opening capable of covering a part or all of an opening which includes an opening of an air intake port or an opening of an exhaust port of the nacelle according to paragraph 0018, 0019, or 0020; and a linkage mechanism between said lid for opening/closing an opening and said box-shaped nacelle, having a guide mechanism or an actuator mechanism for a sliding operation or a swing operation of said lid for opening/closing an opening in an up-down direction, a front-back direction, or a left-right direction. Thus, it is possible to close the air intake port or the exhaust port with the lid when the opening of the thrust generation device of the present invention is not used.

An operation described in paragraph 0022 is a rear structure of the vertical takeoff and landing transport plane, comprising: a through-hole structure penetrating from an airframe top surface to an airframe bottom surface, in an airframe mid rear part positioned at a front side relative to the through-hole structure in the airframe rear part according to paragraph 0017 and positioned at a rear side relative to a main wing of an airframe, wherein the rear structure of the vertical takeoff and landing transport plane is characterized by being configured by: an opening/closing door for linking a rotation shaft in a direction in parallel or approximately parallel to a left-right direction line of an aircraft by a hinge structure provided in a rear direction of aircraft and for partitioning and blocking a through-hole by the same or approximately the same size as that of said through-hole structure in the airframe mid rear part; and a linkage mechanism for linking an area near said through-hole structure and said opening/closing door by a rotation shaft in parallel or approximately parallel to a left-right direction line of an aircraft, where all or part of the linkage mechanism is housed in said through-hole structure, and an actuator mechanism is provided for opening/closing in an up-down direction of an airframe front side of said opening/closing door. Thus, it is possible to pass the air in the up-down direction in an area near the airframe rear part.

An operation described in paragraph 0023 is in an opening/closing door, where the opening/closing door of an opening for entrance and exit according to paragraph 0017 is formed by a separate-type upper-side door and lower-side door, characterized by being configured by: an actuator mechanism for linear operation and for swing operation of said upper-side door configured by: a rotation shaft mechanism for said upper-side door, having a shaft in a direction in parallel or approximately parallel to a left-right direction line of an aircraft; and a rotation shaft mechanism having a shaft in a direction in parallel or approximately parallel to a left-right direction line of an aircraft, for linkage, via a guide mechanism for sliding in a front-back direction of an aircraft, the guide mechanism being installed near a ceiling inside a fuselage of an aircraft, or for direct linkage to near the ceiling inside the fuselage of an aircraft. Thus, it is possible to install the door for closing the opening of the rear entrance/exit of an airframe.

An operation described in paragraph 0024 is a rear structure of an airframe, comprising a structure near a through-hole structure of an airframe rear part having a hole penetrating from the airframe bottom surface to the airframe top surface according to paragraph 0017, positioned in a region in an airframe rear part from an area near a rear part of a main wing to an area near an elevator at a rear part of a horizontal tail of an airframe of the vertical takeoff and landing transport plane, characterized by being configured by: an opening/closing door for partitioning and blocking, from the airframe top surface, a through-hole by the same or approximately the same size as that of the through-hole in an airframe rear part having: a sliding operation mechanism for sliding a door configuring the airframe top surface in a front-back direction of an aircraft; at a linkage part between said sliding operation mechanism and a door configuring the airframe top surface positioned at the back of said sliding operation mechanism, a linkage part for the doors configuring the divided airframe top surface, positioned at the back of said linkage part, and a linkage part between the door configuring the airframe top surface and an area near a horizontal plate configuration part of an aircraft, positioned at said rear side; a swing operation mechanism having a shaft parallel to a left-right direction line of an aircraft. Thus, when the opening/closing door configuring the exterior of the aircraft top surface is moved, it is possible to configure a hole penetrating from the airframe bottom surface to the airframe top surface at the rear part of the vertical takeoff and landing transport plane.

In a vertical takeoff and landing transport plane, which is an object of the present invention, when the orientation of a thrust generation device of an aircraft is changed by a shaft parallel to a left-right direction line of an aircraft into various up-down angles, it is possible to install and move the installation position of the thrust generation device in various locations in an up-down direction. Thus, it is possible to control the posture by lowering an area near the tail and lifting the engine side even during a low speed flight of an aircraft to enable control of more versatile airframe postures. Also, when the air intake port of the thrust generation device is used while positioning it above the horizontal tail, it is possible to prevent an accident where a person and an object are suctioned in. As a result, when the configuration position of the thrust generation device is changed according to the uses, it is possible to provide an effect such that the thrust generation device is changed in a convenient mode.

In a vertical takeoff and landing transport plane, which is an object of the present invention, the exhaust port of the thrust generation device covered with a nacelle, etc., performs a circular operation in an up-down direction, and thus, it is possible to change the direction of the exhaust into various up-down angles. Thus, in addition to the effect in paragraph 0025, when the thrust generation device is surrounded by a box-shaped cover such as a nacelle during a flight, it is possible to provide an effect such as smoothening resistance of external air to the thrust generation device, being capable of efficiently exhausting air sent by the moving blade.

In a vertical takeoff and landing transport plane, which is an object of the present invention, it is possible to change the direction of the exhaust of the exhaust port of the box-shaped thrust generation device covered with a nacelle, etc., which performs a circular operation in a left-right direction around the rotation shaft, etc., into various left-right angles, and thus, it is possible to provide an effect such as freely rotating the orientation of an airframe of an aircraft by using power in a left-right direction.

In a vertical takeoff and landing transport plane, which is an object of the present invention, in the box-shaped thrust generation device covered with a nacelle, etc., it is possible to change the direction of the exhaust by a deflection plate for changing a direction of air to be exhausted in left-right direction, an up-down direction, etc., into various angles such as left-right and up-down directions. Thus, it is possible to provide an effect such as freely rotating the orientation of an airframe of an aircraft by using power in a left-right direction, an up-down direction, etc.

In a vertical takeoff and landing transport plane, which is an object of the present invention, it is possible to keep the lid closed when the opening of the present invention is not used, and thus, it is possible to provide an effect of being capable of reducing aerial resistance during movement when the device of the present invention is not used.

In a vertical takeoff and landing transport plane, which is an object of the present invention, it is possible to let the air escape in an up-down direction in an area near the rear part of an airframe, and thus, it is possible to provide an effect such that a force for directly lifting the airframe as a result of a tailwind contacting the rear part of the airframe is caused to escape.

In a vertical takeoff and landing transport plane, which is an object of the present invention, it is possible to install a door in the opening of the rear entrance/exit of an airframe, and thus, it is possible to provide an effect such that an indoor area is not likely to be influenced by an external pressure, an external temperature, and weather.

In a rear structure of the vertical takeoff and landing transport plane, which is an object of the present invention, when the opening/closing door configuring the exterior of the aircraft top surface is moved, it is possible to configure a hole penetrating from the airframe bottom surface to the airframe top surface, in a rear part of the vertical takeoff and landing transport plane. Thus, it is possible to simplify the rear structure of the vertical takeoff and landing transport plane by reducing the area where the aerial resistance of the airframe rear part by a tailwind is received.

BRIEF DESCRIPTION OF THE DRAWINGS

FIG. 15 shows an example of a simplified diagram of claim 4 of the present invention.

FIG. 16 shows an example of a simplified diagram of a hollow structure capable of being used in the present invention.

DETAILED DESCRIPTION OF THE PREFERRED EMBODIMENTS

An actuator is a conversion device for converting fluid energy of hydraulic oil into mechanical energy, and includes a hydraulic cylinder and a pneumatic cylinder that perform a linear operation and a hydraulic motor and a pneumatic motor that perform a swing operation. (Described on page 138 of Non Patent Document 10)

Guiding means "to cause a mechanical component to operate correctly in a constant direction by using a sliding pair" (see Non Patent Document 19), a mechanism means "combination of parts which performs a constant relative operation when only transmission and conversion of a mechanical operation are considered" (see Non Patent Document 19), and "internal structure of machine" (see 6th edition of Kojien (Japanese dictionary published by Iwanami), and in a guide mechanism in the present invention, mechanical components such as a rail are a mechanical structure through which a correct operation is caused in a constant direction by using a sliding pair.

FIG. 2 shows an example of a simplified diagram of a rear structure of the vertical takeoff and landing transport plane having the characteristics of claim 6 of the present invention. In FIG. 2(A), an "airframe mid rear part" according to claim 6 (in FIG. 2, an area before a through-hole structure (5) around (9)) is provided with a "through-hole structure penetrating from the airframe top surface to the airframe bottom surface" (airframe structure (5) around the door (7)), an "opening/closing door for partitioning and blocking a through-hole" (7) according to claim 6 links a "rotation shaft in a direction in parallel or approximately parallel to a left-right direction line of an aircraft by a hinge structure provided in a rear direction of an aircraft (area near dotted line X in FIG. 2(B)), and the opening/closing door (7) is lifted by a robot arm (8), which is a "linkage mechanism having an actuator mechanism for opening/closing in an up-down direction of an airframe front side of the opening/closing door" having a "rotation shaft in parallel or approximately parallel to a left-right direction line of an aircraft" according to claim 6.

Figure 1A:
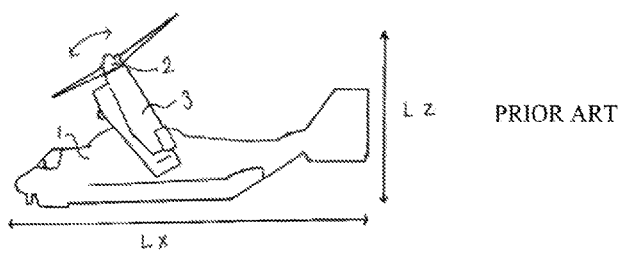
FIG. 1 shows an example of a simplified diagram of an operation of a conventional vertical takeoff and landing transport plane.
Figure 1B:
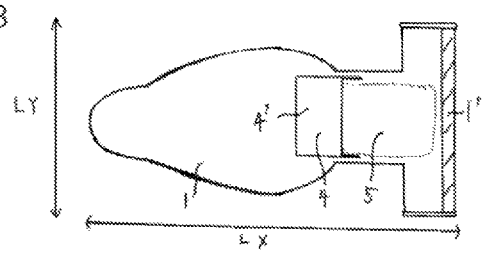
Figure 1C:
Figure 1D:
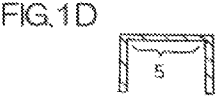
Figure 1E:
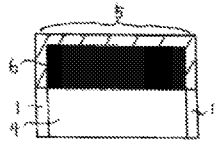
Figure 1F:
Figure 2A:
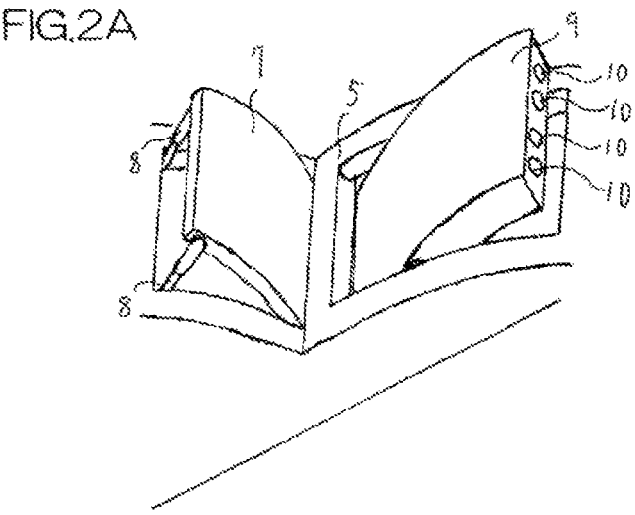
FIG. 2 shows an example of a simplified diagram of a rear structure of the vertical takeoff and landing transport plane having the characteristics of claim 6 of the present invention.
Figure 2B:
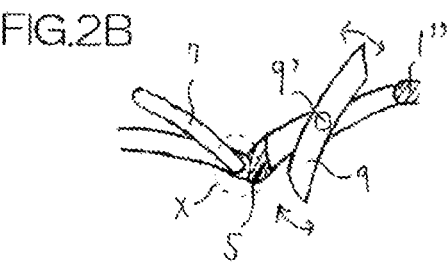
Figure 2C:
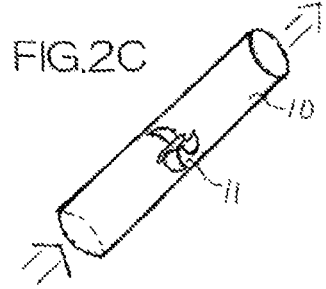

Further, (9) is a box-shaped nacelle, where a propeller (11) is internally provided which is for forwarding the air pressure to a rear part of the airframe top surface from the airframe bottom surface (see FIG. 2(C)), and a hollow exhaust hole (10) is provided which is for forwarding the air to the rear part of the airframe top surface from the airframe bottom surface. The box-shaped nacelle is similar to the thrust generation device according to claim 2, which enables exhaust of the air as a result of swing operation by a shaft linked to the airframe rear part.

FIG. 2(B) is a cross-sectional view obtained when FIG. 2(A) is seen from its side. Numeral (8) is achieved when its front side is lifted by the robot arm operating similarly to the hydraulic cylinder. In (10) provided in (9), a suction opening part for suctioning the air can be arranged on the airframe bottom surface and an exhaust opening part for exhausting the air can be arranged on the airframe top surface as a result of swing operation of (9) in an arrow direction around the rotation shaft (9'), which is a "rotation shaft in parallel or approximately parallel to a left-right direction line of an aircraft." Numeral (10) is structured so that (9) is swung to be restored to its original position so as to be integrated with the airframe surface.

Figure 2D:
Figure 2E:

FIG. 2(D) shows a simplified cross-sectional view of a mechanism capable of forwarding the air in an upper direction of the rear part of the airframe from a lower part of the airframe, to an area near the rear part of the airframe. This mechanism has an effect such that an area near the rear part of the airframe is lowered. To provide this effect, a hole integrated with the airframe rear part of an airplane forwards the air by the propeller (11), an electric motor (12), and a leg (12') supporting the motor, in the upper direction facing the rear of the airframe, from the lower part of the airframe. FIG. 2(E) is a cross-sectional view obtained when FIG. 2(D) is seen from the rear of the airframe.

Figure 3A:
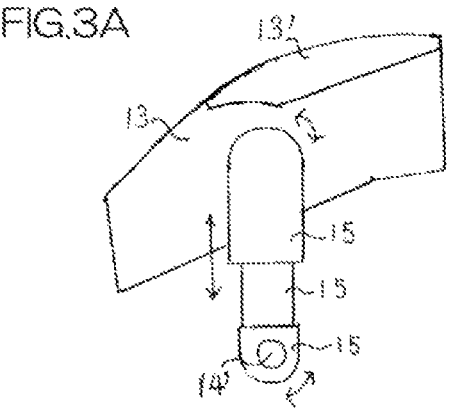
FIG. 3 shows an example of a simplified diagram of claim 1 or claim 2 of the present invention.
Figure 3B:
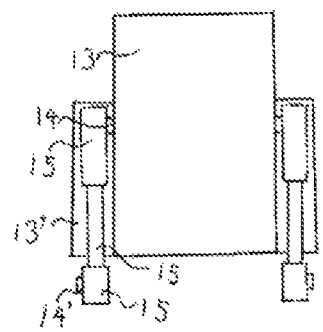

FIG. 3(A) is an example of a simplified diagram obtained when claim 1 or claim 2 is seen from its side. FIG. 3(B)

shows an example of a simplified diagram obtained when FIG. 3(A) is seen from below. Numeral (13) is a "thrust generation device having a rotary moving blade for exhausting air in a direction from a lower side to an upper side of an airframe and having a size allowing a part or all of the device to be inserted in said through-hole structure in the airframe rear part" according to claim 1. Numeral (13) also is a "box-shaped nacelle penetrating from a side of the airframe bottom surface to a rear side of the airframe top surface, for surrounding and supporting said case" according to claim 2.

Further, (13) has a protruded portion (13') for blocking an upper part of the airframe. A hydraulic cylinder-type robot arm (15) is an "actuator mechanism where a rotation shaft mechanism having a rotation shaft in parallel or approximately parallel to the left-right direction line of an aircraft is configured both in an area near the through-hole structure of said rear part of an airframe and said thrust generation device; and where one end is linked to the rotation shaft mechanism in an area near said through-hole structure in the rear part of an airframe and the other end is linked to the rotation shaft mechanism of said thrust generation device," which is linked by the rotation shaft (14) and is described in claim 1, and includes a rotation shaft (14') for linking to an airframe. Numeral (15) itself is to expand and contract like a hydraulic cylinder. The actuator or the actuator mechanism described in the present invention may or may not be capable of expanding and contracting in length, and may be optionally selected according to respective mechanisms. The types thereof are not limited.

Figure 3C:
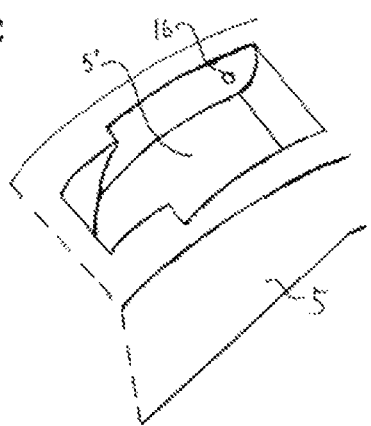

FIG. 3(C) is an example of a simplified diagram obtained when the airframe rear part in claim 1 or claim 2 is seen from obliquely above. Numeral (16) is a bearing part linked to (14') for swing operation, and (5') is a "through-hole structure of the airframe rear part" provided in (5) having a shape housing (13) in a "hole penetrating from an airframe bottom surface to an airframe top surface" according to claim 1, and a through-hole in which the "actuator mechanism" according to claim 1 can also be housed. The type of shape, the structure, and the material of these are not limited as long as a condition of claim 1 or claim 2 is satisfied.

Figure 3D:
Figure 3E:
Figure 3F:
Figure 3G:

FIGS. 3(D) to 3(G) show a simplified diagram of an example of an operation diagram of claim 1 or claim 2. FIG. 3(D) is a diagram showing a state where (13) which is flying in an airplane mode and a "through-hole structure of the airframe rear part" (5) according to claim 1 are integrated with an airframe when aerial resistance is hardly received. FIG. 3(E) is a diagram showing a state where (13) is lifted so as not to interfere with diving when diving during flying. FIG. 3(F) is a diagram obtained when (13) is lower than the through-hole so that the main wing does not hit (13) when the airframe is housed. FIG. 3(G) is a diagram showing a state obtained when (13) is lifted so that a person is not suctioned in during military operation near the ground.

FIG. 4 shows an example of a simplified diagram of claim 7. FIG. 4(E) is a cross-sectional view obtained when an area near the "upper-side door" according to claim 7 is seen from its side. FIG. 4(F) is a diagram obtained when FIG. 4(E) is seen from a front of an exit/entrance side. In these figures, by using the "actuator mechanism" (15) according to claim 7, a rod of the hydraulic cylinder and a hydraulic-type robot arm corresponding to a guide part of the rod are linked to the door (16) via the "rotation shaft mechanism" (14') in a "direction in parallel or approximately parallel to a left-right direction line of an aircraft." Numeral (15) is obtained when the "guide for sliding" (17) having a rail structure according to claim 7 is installed in an area "near a ceiling inside the fuselage of an aircraft" to be linked by the "rotation shaft mechanism" (14).

The actuator mechanism used in claim 7 may have a length expansion/contraction mechanism, or the length may be unchanged. Further, an actuator for joint may be linked with a guide, etc., and may be directly installed to an airframe of an aircraft by a rotation shaft. The types of shapes or structure of these are not limited.

Figure 4A:
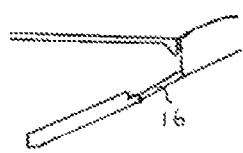
FIG. 4 shows an example of a simplified diagram of claim 7 of the present invention.
Figure 4B:
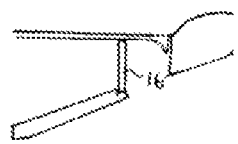
Figure 4C:
Figure 4D:
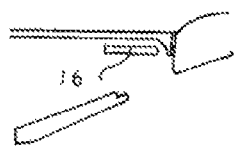

FIG. 4(A) is a diagram where an upper door (16) is installed at the opening. FIG. 4(B) is a diagram where (16) is installed at the ceiling. FIG. 4(C) is a diagram where (16) is moved inside the fuselage when used together with a device in claim 6. FIG. 4(D) is a diagram where (16) is simply lifted.

Figure 4E:
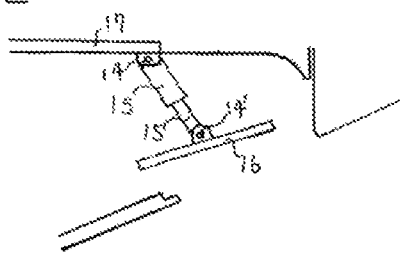
Figure 4F:
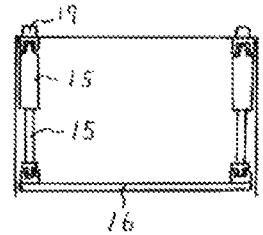

By the structure in FIG. 4(E), an upper door is formed into the states of FIGS. 4(A) to (D). The actuator for causing (14) to perform a swing operation may be attached with an object for performing a swing operation or for performing a linear operation. Further, various types of shapes of a guide mechanism for sliding of a suspension rail type for performing a linear operation of (17) may be adopted. The types such as a shape, a structure, and a material for these are not limited.

Figure 5A:
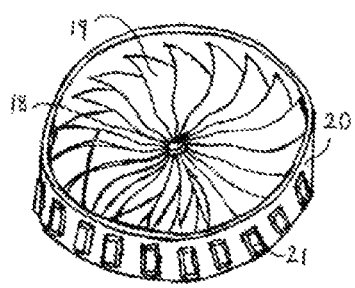
FIG. 5 shows an example of a simplified diagram of a moving blade for a compressor capable of being used in the present invention.
Figure 5B:
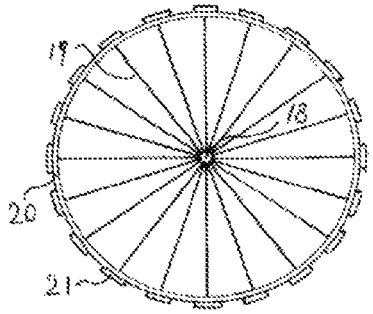

FIG. 5 shows an example of a simplified diagram of an electric moving blade capable of being used in the present invention. FIG. 5(A) is a diagram obtained when an air suction side of the electric moving blade is seen from an oblique direction. FIG. 5(B) is a diagram obtained when the front side of FIG. 5(A) is seen from above. Numeral (18) is a rotation shaft or a bearing by which the moving blade is rotated (a protrusion may be a shaft and a hole-like shape may be a bearing). Numeral (19) is a blade of the moving blade for forwarding the air to a rear part. A rotor ring (20) is a type of a moving blade having a magnet (21) along the outer circumference of the ring, where the ring (20) is joined to (19) in the inner circumference. The ring (19) is rotated by a motor stator installed in a case, or a fan case, etc.

Further, FIG. 5 shows a type of a moving blade using the principle of an in-wheel motor for an electric vehicle (see pages 54 to 57 in Non Patent Document 8), where a rotor bracket part is a blade.

Figure 6A:
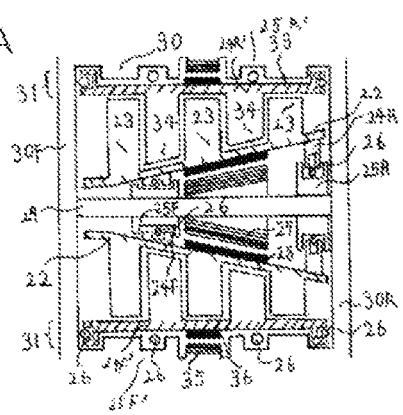
FIG. 6 shows an example of a simplified diagram of a moving blade for a compressor capable of being installed in a claim of the present invention.

FIG. 6 shows a simplified diagram of an example of a model showing a positional relationship between a "hole-structured case surrounding a moving blade in a circumferential direction and penetrating for ventilation of air in a front-back direction from front to rear" (30) that can be installed in a claim of the present invention and a "compressor in which a plurality of moving blades are stacked one after another." FIG. 6(A) is a cross-sectional view obtained when the electric moving blade is seen from its side. FIG. 6(B) shows a fixation support part of a moving blade, installed on an air introduction channel. FIG. 6(C) is a model diagram showing a positional relationship between a blade fixation part (22) of a moving blade on the inner side and a shaft (29). FIG. 6(D) shows a simplified diagram of an appearance of the blade fixation part (22) of a moving blade on the inner side.

A bearing, a holder, and a support structure thereof used in the present invention include a rolling bearing, a sliding bearing, a bearing, etc.; those having a structure and a material similar to those used in a jet engine; and a bearing for alternator, etc., in Non Patent Document 7, and various types of these are used. As long as the condition for the present invention is satisfied, the types of these are not limited.

An electric compressor rotation power mechanism in FIG. 6(A) for compressing air to be forwarded from front to rear is configured by: a compressor rotation power mechanism in which a moving blade rotating in one direction has a plurality of radially arranged blades (23) for exhaust from front to rear fixed along the outer circumference of a tapered rotor ring (22), support structures (24F, 25F and 24R, 25R) of the above-described moving blade configured by support structures (29; 24F, 25F; and 24R, 25R) of a rotor ring having a shaft structure or a bearing structure linked to a plurality of legs (30F, 30R), where the plurality of legs are radially arranged toward the inner direction of the case from the above case (30) or an area near the case (30) and positioned at the center of the above case or the area near the center, and the above rotor ring (22) in which a magnet (28) is installed for a function as a motor rotor, and a support structure of the above rotor ring in which a coil part (27) having a conductor (electric wire) for a function as a motor stator is installed or a structure in an area near the support structure of the above rotor ring (22) are configured; and a compressor rotation power mechanism in which a rotor ring (33) rotating in a reverse direction of the above rotor ring, for installing a blade in a position before or after the above rotor ring (22), has a plurality of radially arranged blades (34) fixed along the circumference inside the rotor ring (33), the rotor ring (33) is configured by support structures (24F', 25F'; 24R', 25R'; 26; and 31) of a rotor ring rotatable along a ring shape installed in the above case (30) or an area near the case (30), and the above rotor ring (33) in which a magnet (36) is installed for a function as a motor stator, and a support structure of the above rotor ring (33) in which a coil part (35) having a conductor (electric wire) for a function as a motor stator is installed or a structure in an area near the support structure of the above rotor ring (33) are configured; and a compressor rotation power mechanism, where when a clockwise blade and a counterclockwise blade having a rotation center coaxial or approximately coaxial in a front-back direction are alternately rotated in the reverse direction and are combined in multiple stages, whereby the air is compressed and exhausted from front to rear of the case.

Further, the rotor ring (33) in FIG. 6 is fixed to enable rotation by the case (30), and the rotor ring (22) in FIG. 6 is fixed to enable rotation by a shaft structure or a bearing structure (29). However, the types of bearings such as a rolling bearing and a sliding bearing, and a combination of bearings etc., may be optionally chosen, and a configuration position of a bearing, etc., in the rotor ring may be selected from various locations.

In the electric moving blade in FIG. 6(A), by rotation shafts (29; 24F, 25F; and 24R, 25R) fixed to the center of legs of a front ring-shaped fixation part (30F) and a rear ring-shaped fixation part (30R), the rotation rotor (22) is fixed to enable rotation by a bearing structure via a bearing (26), and by fixation parts (24F', 25F'; 24R', 25R'; 26; and 31) along the outer circumference of the electric moving blade, the rotation rotor (33) is fixed to enable rotation by a bearing structure via a bearing (26).

Further, FIG. 6(A) shows an electric moving blade having a structure capable of being used in a power part of a brushless motor or an alternate motor, for compressing and forwarding the air from front to rear, where the rotation rotor (22) is rotated by a force from a magnetic rotor (28) installed on the inside and a conducting coil (27) installed along the rotation shaft (29), and the rotation rotor (33) is rotated by a force from a magnetic rotor (36) installed on the outside and a conducting coil (35) installed in the hole-structured case (30) along the outer circumference of the electric moving blade.

Figure 6B:
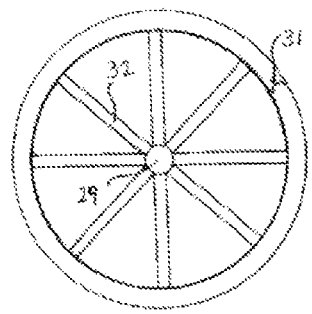

FIG. 6(B) is a simplified diagram of the fixation support part of a moving blade, installed on an air introduction channel. The figure is obtained when the fixation support part is seen from a front side in a vertical direction of FIG. 8(A), where legs (32) of a stator blade type, for supporting the rotation shaft (29), capable of housing a coil conduction wire therein, are fixed to (30) via a circumferential structure (31) capable of rolling the bearing (26). The case (30) and the rotor ring (33) may be fixed to enable rotation sandwiching a bearing as in (25F and 24F in FIG. 6(A)) and (24R and 25R in FIG. 6(A)). A combination of bearings etc., may be optionally chosen, and a configuration position of a bearing, etc., in the rotor ring may be selected from various locations.

Figure 6C:
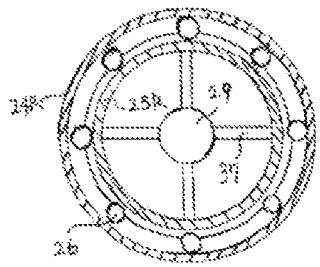

FIG. 6(C) is a model diagram showing, in a simplified manner, a positional relationship between the ring-shaped blade fixation part (22) of a bearing on the inner side and the bearing fixation part (29) on the shaft side. The figure is a cross-sectional view where numerals (25R) and (29) are fixed via the support legs (37), and (24)R is positioned, via the bearing (26), on the outside.

Figure 6D:
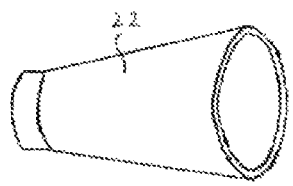

FIG. 6(D) is a simplified diagram of the blade fixation part (22) of a moving blade on the inner side, and is a simplified diagram where blade fixation part (22) is conceived from a compression part of a jet engine (in the jet engine, a part positioned at the blade (34) is a stator blade).

FIG. 7 shows an example of a simplified diagram showing an area near the moving blade capable of being installed in a claim of the present invention.

(IR) denotes a compressor moving blade in which a plurality of radially arranged blades are fixed to a circumference outside of the rotor ring.

(OR) denotes a compressor moving blade in which a plurality of radially arranged blades are fixed to a circumference inside of the rotor ring.

(SW) denotes a type of a stator vane used also in a normal jet engine, etc.

(Ca) is a hole-structured case which surrounds the moving blade in a circumferential direction and penetrates for ventilation of air in a front-back direction from front to rear.

Figure 7A:
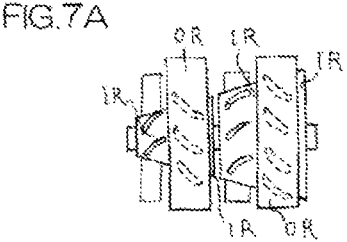
FIG. 7 shows an example of a simplified diagram of a moving blade for a compressor capable of being installed in a claim of the present invention.

FIG. 7(A) shows a single compressor, which is obtained in a stacked manner when a total of two pairs of which each pair is a rotor ring rotating in a constant direction and a rotor ring rotating in a reverse direction are combined.

Figure 7B:
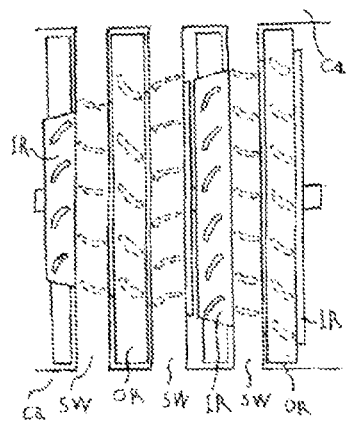

FIG. 7(B) shows a single compressor, which is obtained in a stacked manner when (OR) and (SW) are sandwiched by (IRf) and (IRr), which are moving blades rotating in a constant direction, where (IRf) is (IR) positioned at a front side and (IRr) is (IR) positioned at a rear side, while there are a plurality of rotor rings rotating in a reverse direction.

Figure 7C:
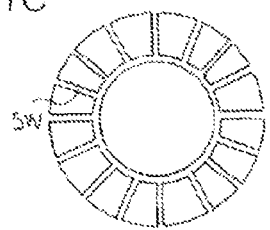

FIG. 7(C) shows an example of a simplified diagram obtained when the stator vane is seen from its front, where the stator blade is used to support an area near the rotor of the moving blade by the ring structure provided on the inside. A mechanism, a shape, and a structure of a normal jet engine may be adopted, and a combination obtained when an optional bearing is used may also be used. The types thereof are not limited.

Figure 7D:
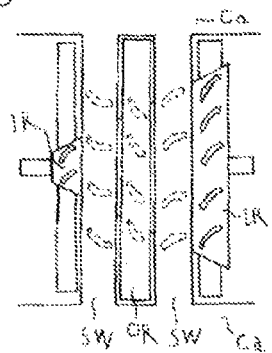

FIG. 7(D) shows a state where two stator vanes (SW) and one rotor ring (OR) rotating in a reverse direction are arranged at one moving blade (IR).

Figure 7E:
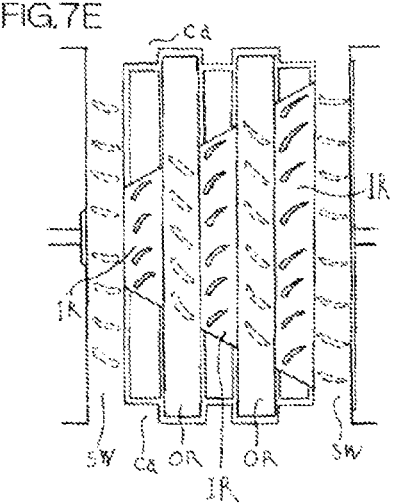

FIG. 7(E) shows a state where in one moving blade (IR), there are two independent rotor rings (OR) rotating in a reverse direction, relative to (IR), and there are stator vanes (SW) on both sides, before and after, of the moving blade (IR) and (OR).

In FIG. 7, a case (Ca) is configured so that a space for ventilation from an area near the suction port to an area near the exhaust port is approximately the same size. In reality, however, the space for ventilation may be partially tightened as in Reference Literature 20, and the types of shapes and structures are not limited.

The rotation speed of the rotor ring having a power source located at the center side may be set constant, and a plurality of rotor rings at the outer circumferential side having various rotation speeds may be arranged, and the types thereof are not limited.

The number of blades in (IR) or (OR), the number of stages of the rotary moving blades and a pattern of combinations thereof may not be limited, and a shape, a structure, and a material configuring the same may not be limited.

FIG. 8 shows an example of a simplified diagram of a box-shaped structure in claim 3 and claim 5 of the present invention. FIG. 8(A) is a cross-sectional view obtained when the box-shaped structure in claim 3 is seen from its side. FIG. 8(B) is a cross-sectional view obtained when FIG. 8(A) is seen from above. FIGS. 8(C) and 8(D) are cross-sectional views of a rear structure of the box-shaped structure. FIG. 8(E) is a cross-sectional view of a structure in an area near a lower side at the front of the box-shaped structure. FIG. 8(F) is a cross-sectional view of a structure in an area near an upper side at the front of the box-shaped structure.

Figure 8A:
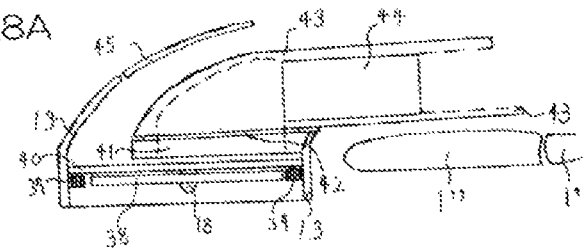
FIG. 8 shows an example of a simplified diagram of a box-shaped structure in claim 3 and claim 5 of the present invention.

In FIG. 8(A), (38) is a rotor ring having a rotor structure on the outer circumferential side. Numeral (38) is a moving blade in FIG. 5 which is linked to the rotation shaft (18) and performs rotation, and rotates according to the principle of a motor by a stator coil (39) arranged inside (13). Numeral (38) is linked to a leg (40) for fixation via the rotation shaft (18) with (13) having a radial blade structure similar to the stator blade of the jet engine.

Numerals (43) and (13) denote a nacelle having "cases on both sides in the front-back direction, positioned in a particular location in the plurality of linked cases" of a "hole-structured case in which a plurality of cases are linked in a front-back direction of an air flow" according to claim 3, and the nacelle has a linked case structure linked by a vertically penetrating linkage part (41) which is fixed, with (13), by the ring-shaped rotation shaft (42), which linkage part is "linkage between a hollow ring installed in one case and a linkage ring that serves as a bearing for guiding said ring installed in the other case" according to claim 3, and the "linked case structure having a ring-shaped rotation shaft mechanism, in which a cavity is formed for ventilation, for swing operation in clockwise and counterclockwise directions" according to claim 3.

Numeral (45) is a "lid for opening/closing an opening capable of covering a part or all of an opening" according to claim 5, which is a lid that is opened and closed through vertical operation, and also is a bypass through which air from (40) is exhausted. Numeral (44) is the compressor in FIG. 6.

Figure 8B:
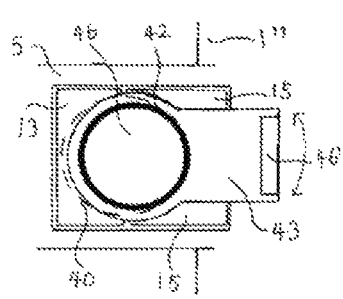

In FIG. 8(B), (46) is a vertically penetrating hole, (46') is a hole from which air passing through (44) goes out, and (43) is a box according to claim 3 capable of swing operation in an arrow left-right direction.

Figure 8C:
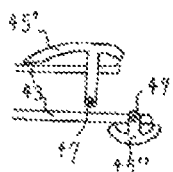
Figure 8D:

FIGS. 8(C) and (D) show a device in which lids (45'), (45") perform swing operation to block a part of the air exhaust port (43) to change a flow of exhaust. The device is equivalent to a "deflection plate which has a rotation shaft having a vertical or oblique angle relative to the front-back direction line of an aircraft and which is for changing a direction . . . " configured in an area "near an exhaust hole in a rear part of said box-shaped nacelle" according to claim 4.

Figure 8E:
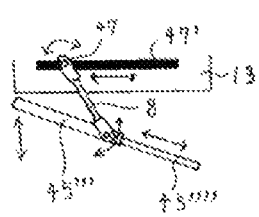

In FIG. 8(E), at a lower part of an "opening of an air intake port of the nacelle" according to claim 5, a "lid for opening/closing an opening capable of covering part or all of an opening" (45''') and a lid (45'''') for changing the size of the lid by entering into (45''') perform a swing operation or a movement operation in an arrow direction to achieve an opening/closing operation. At this time, the lids (45''') and (45'''') have a "linkage mechanism between said lid for opening/closing an opening and said box-shaped nacelle" according to claim 5, capable of moving the opening of the air intake port to a front side or a rear side.

Figure 8F:

FIG. 8(F) shows an area near (45) in FIG. 8(A). When (45) performs a vertical operation, that is, a swing operation, in an arrow direction, the opening is opened or closed. When (45) is opened, a bypass is formed from which the air is exhausted.

EXAMPLES

Figure 9:
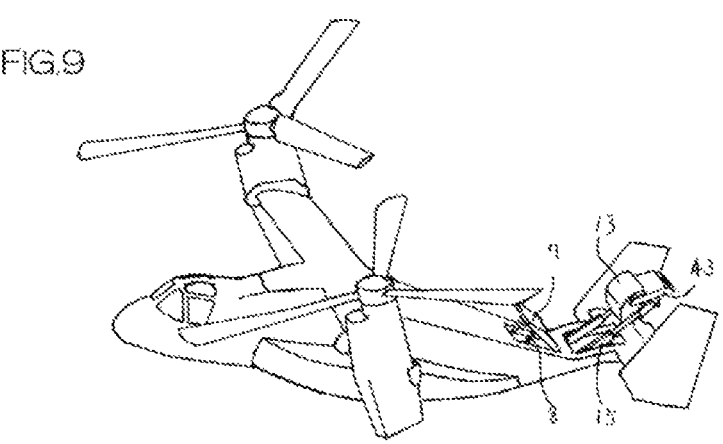
FIG. 9 shows an example of a simplified diagram of a vertical takeoff and landing transport plane equipped with a box-shaped structure of the present invention.

FIG. 9 shows an example of a simplified diagram of a vertical takeoff and landing transport plane provided with a box-shaped structure, where the device of the present invention is used. In the figure, (13) is lifted by (15). When the orientation of (43) is changed, an exhaust direction is changed. When the opening/closing door (7) linked with the hinge structure according to claim 6 of the present invention is lifted by the actuator (8), a through-port is configured vertically relative to an aircraft so that an air pressure is released.

The types of a shape, a structure, and a material are not limited as long as the conditions of claims of the present invention are satisfied.

Figure 10:
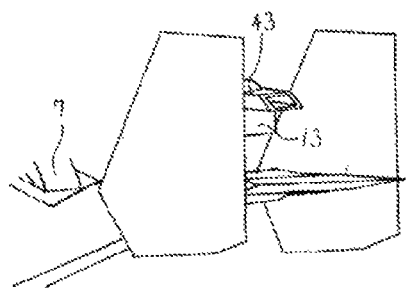
FIG. 10 shows an example of a simplified diagram obtained when the rear structure in FIG. 9 is seen from obliquely behind.

FIG. 10 shows an example of a simplified diagram obtained when the rear structure in FIG. 9 is seen from obliquely behind, where the device according to claim 3 of the present invention is operated in a left-right direction.

FIG. 11 shows an example of a simplified diagram of a power generation device capable of being used in the present invention. FIG. 11(A) is a diagram obtained when an area near the rear fuselage of an airframe in which the power generator is installed is seen from above. FIG. 11(B) is a diagram obtained when an area near FIG. 11(A) is laterally seen, where a thrust by the exhaust gas from the engine is released to a left-right direction of an aircraft.

Numeral (48) denotes a rotor part for power generator, (49) denotes a shaft through which the power is transmitted, (50) denotes a power part for power generation obtained by reducing the size of a turbo shaft engine, (51) denotes a deflection plate in an exhaust direction, formed by a plate having a rotation shaft, for changing and exhausting the thrust generated by the exhaust gas to an optional direction such as a right side or a left side, (52) denotes an air-intake duct from an obliquely front direction, and (52') denotes an exhaust duct for exhaust gas from an engine in an obliquely lateral direction.

Figure 11A:
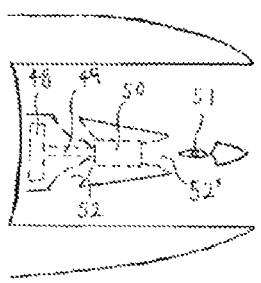
FIG. 11 shows an example of a simplified diagram of a power generation device capable of being used in the present invention.
Figure 11B:
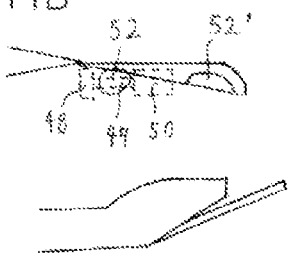
Figure 11C:
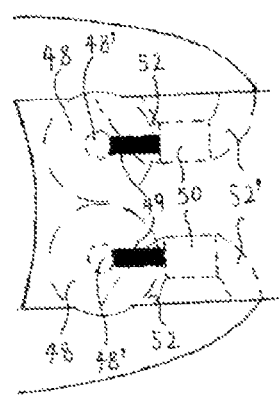
Figure 11D:
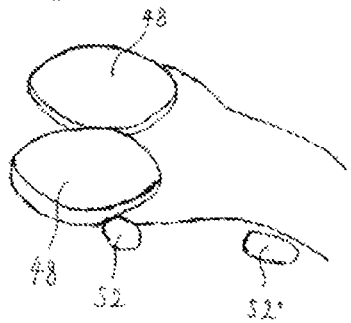
Figure 11E:
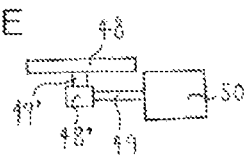

FIGS. 11(C), 11(D), and 11(E) show an example where two (50) in FIG. 11(A) are arranged. FIG. 11(C) is a simplified diagram obtained when an area near the power generator is seen from just above. FIG. 11(D) is a simplified diagram obtained when FIG. 11(C) is seen from obliquely behind. FIG. 11(E) is a simplified diagram obtained when an area near the power generator in FIG. 11(C) is seen directly from its side.

Numerals (48), (50) in FIG. 11(C) are power generators which are linked at a right angle via a shaft (49, 49') in a straight bevel gear, etc., (see page 49 in Non Patent Document 5) inside a sealed gear box (48') in which a gear enters therein with a penetrating shaft, as in FIG. 3(E), whereby power is generated. As compared to FIG. 11(A), it is possible to increase the size of the rotor (48).

FIG. 11(D) is a simplified diagram showing an air intake port (52) and an air exhaust port (52') arranged at the lower part of (48) in the airframe of an aircraft. When the form as shown in the figure is achieved, it is possible to install, in the airframe of an aircraft, a power generator naturally embedded in a line of the airframe with a large power generation capacity.

Figure 11F:

FIG. 11(F) is a simplified diagram of an example of an air exhaust duct. The air exhaust duct takes a shape similar to an air exhaust duct used in a conventional aircraft. When the exhaust port (53) swings in an up-down direction, the orientation of gas to be exhausted is changed. When the deflection plate (54) of the air exhaust port is caused to perform a swing operation, the orientation of the exhaust is moved closer to the airframe or the orientation is faced outward of the airframe. The types of a combination of the air exhaust duct, etc., are not limited.

Further, a battery storage device such as a secondary battery and a capacitor may be used. A battery storage device such as a secondary battery and a capacitor may be recharged during a cruise flight, and the power may be used for the device of the present invention during a low-speed flight, etc. In either case, the battery storage device requires a high level of safety with a flame-retardant property.

FIG. 12 shows an example of a simplified diagram of a part of an airframe structure of an aircraft capable of being used in the present invention. FIG. 12(A) shows a relationship diagram obtained when an upper-side door according to claim 7 of the present invention and an actuator mechanism are seen from a left-right direction of an aircraft. FIG. 12(B) shows a relationship diagram obtained when FIG. 12(A) is seen from a front-back direction of an aircraft. A door plate (57) is linked by the rotation shaft (58) to the actuator (55) and the actuator (56), individually. Numeral (56) is a mechanism directly fixed to (55) to be expanded and contracted so that angles between (55) and (57) are caused to be changed. Numeral (55) expands and contracts so that (57) moves in a front-back direction of an aircraft.

Figure 12A:
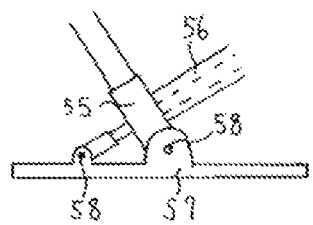
FIG. 12 shows an example of a simplified diagram of a hydraulic system capable of being used in the present invention.
Figure 12B:
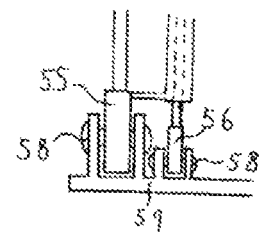

In FIG. 12(A) and FIG. 12(B), an actuator performing reciprocating linear operation is used; however, an actuator performing a swing operation such as a hydraulic motor may be used for (58), and the types are not limited.

Figure 12C:
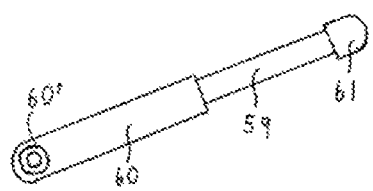
Figure 12D:
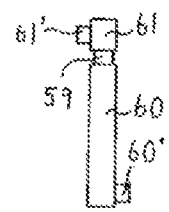

FIG. 12(C) and FIG. 12(D) show a simplified diagram of an example of an actuator capable of being used in claim 1 of the present invention. The actuator expands and contracts as a result of a cylinder (60) having a rod (59) therein performing a linear reciprocating operation. In this actuator, a rotation shaft (60') arranged at (60) and a rotation shaft (61') arranged at a rod support part (61) fixed to (59) perform a swing operation, whereby the angle or the configuration position of the thrust generation device of the present invention is moved.

Figure 12E:
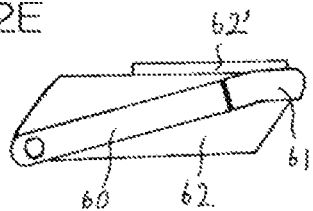

FIG. 12(E) is a simplified diagram of a lower portion of the nacelle according to claim 3 of the present invention. Numeral (62) denotes a thrust generation device of the present invention having an air intake port. Numeral (62') denotes a rotation ring linked to the upper nacelle.

Figure 12F:
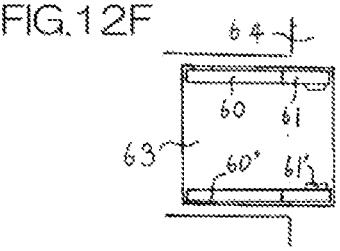

FIG. 12(F) shows an example of a simplified diagram of an area near the rear part of the aircraft of the present invention. In an area near the horizontal tail (64), a through-port (63) according to claim 1 from the top surface to the bottom surface of the aircraft rear part is arranged.

Figure 12G:
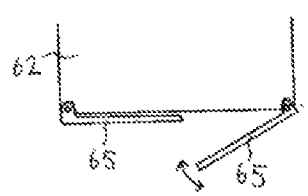

FIG. 12(G) shows a simplified diagram of an example of a lid which is capable of covering the opening of an intake port according to claim 5 of the present invention and which is arranged at the lower part of the thrust generation device according to claim 3 of the present invention. The figure shows a lid (65) which opens/closes in an arrow direction and which covers the opening by opening in both left and right directions, at the lower part of the nacelle (62), which is seen from a front-back direction of an aircraft. The actuator by which the door (65) is opened in both directions may be either of swing operation type or sliding operation type. The types are not limited.

Figure 12H:
Figure 12I:
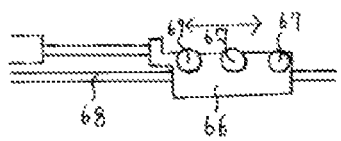

FIG. 12(H) and FIG. 12(I) show a simplified diagram of an example of a "guide mechanism for sliding in a front-back direction of an aircraft, the guide mechanism being installed near a ceiling inside a fuselage of an aircraft" according to claim 7. FIG. 12(H) is a cross-sectional view obtained when the guide mechanism for sliding having a rail structure is seen from a front-back direction of an aircraft. FIG. 12(I) is a cross-sectional view obtained when seen from a left-right direction of an aircraft.

Numeral (66) is a part linked with the actuator mechanism according to claim 7, and a wheel (67) is moved in an arrow direction along a guide rail (68), for example.

FIG. 13 shows an example of a simplified diagram showing a component included in the thrust generation device according to claim 1 of the present invention. FIG. 13(A) is a diagram obtained when the thrust generation device having a power and a propeller is seen from its side. FIG. 13(B) is a diagram obtained when a propeller part is seen from just above. FIG. 13(C) is a diagram obtained when a cover part in FIG. 13(A) is seen from just above. FIG. 13(D) is a diagram obtained when FIG. 13(C) is seen from its side. FIG. 13(E) shows a diagram where an area near the rear part of an aircraft performs a swing operation.

Figure 13A:
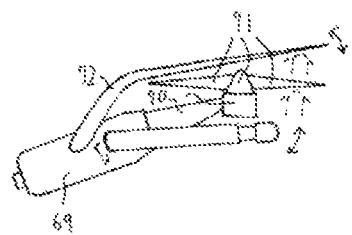
FIG. 13 shows an example of a simplified diagram of an engine capable of being used in the present invention.

In FIG. 13(A), (69) denotes a turbo shaft engine, (70) denotes a power transmission mechanism having a power transmission shaft and a gear, (71) denotes a propeller part for generating a thrust, and (72) denotes a cover of the thrust generation device, where a rotation energy by (69) is transmitted through (70) to thereby rotate (71), as a result of which it is possible to provide the effect of claim 1.

Figure 13B:
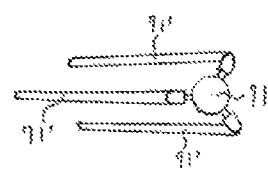

FIG. 13(B) shows (71) with a propeller blade (71') folded by a mechanism similar to that of an Osprey.

Figure 13C:
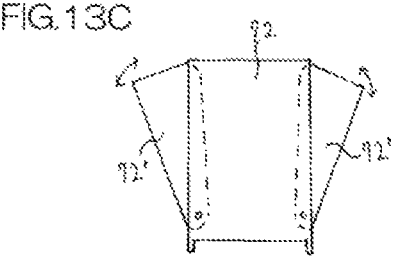
Figure 13D:
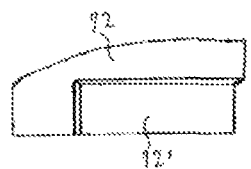

In FIG. 13(C) and FIG. 13(D), when (72') is closed, by covers (72') which are arranged at the left and right of the cover (72) and which can move in an arrow direction, during a state of FIG. 13(B) where the tip end of the propeller faces the front of an airframe, it is possible to move the thrust generation device to a lower part of an airframe after passing through a through-port in claim 1 arranged at a rear part of an aircraft.

Figure 13E:
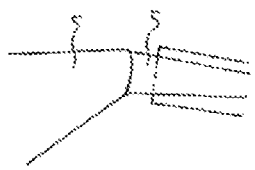

FIG. 13(E) shows an example where when the area near the rear part (5) of an aircraft according to claim 1 of the present invention is swung and folded, the thrust generation device and an area near the main wing are prevented from coming into contact with each other when a main wing of an Osprey, etc., is housed.

Figure 14A:
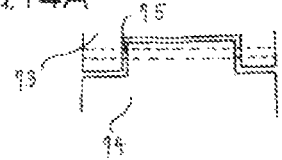
FIG. 14 shows an example of a simplified diagram of a hinge structure capable of being used in the present invention.
Figure 14B:
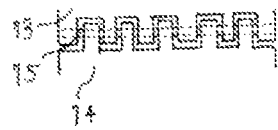
Figure 14C:
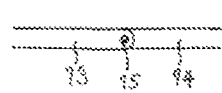
Figure 14D:
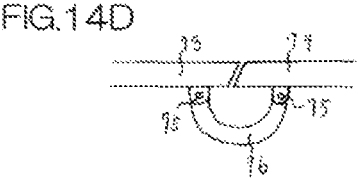

FIG. 14 shows an example of a simplified diagram obtained when the hinge structure capable of being used in the present invention is seen from an upper direction. FIG. 14(A) shows that a hinge structure between a member (73)

at an airframe side and a member (74) at a door side has a rotation shaft (75) penetrating to be fit through holes penetrated through in a left-right direction of both (73) and (74) while a protrusion part of (74) is sandwiched by convex-concave parts on the left and right of (73). FIG. 14(B) shows a hinge structure between (73) and (74) of a shape where a plurality of convex-concave parts are sandwiched alternately for a plurality of number of times and the rotation shaft (75) is penetrated to be fit therethrough. FIG. 14(C) is a diagram obtained when FIG. 14(A) is seen from its side. FIG. 14(D) is an example of a hinge structure obtained when the hinge in FIG. 14(C) is changed.

FIG. 15(A) shows an example of a simplified diagram obtained when the deflection plate according to claim 4 of the present invention is seen from above. Numeral (77) denotes an area near an exhaust hole at the rear part of the box-shaped nacelle. Numeral (78) denotes a "a deflection plate which has a rotation shaft having a vertical or oblique angle relative to the front-back direction line of an aircraft and which is for changing a direction . . . left-right direction of an aircraft" according to claim 4. The deflection plate (78) is arranged "inside the case positioned at the back of the moving blade for exhausting air."

FIG. 15(B) shows a simplified diagram of an example of a cross-sectional view obtained when FIG. 15(A) is seen from its side, where the exhaust is deflected by the rotation shaft (79) in a left-right direction.

FIG. 16 shows an example of a simplified diagram of a structure part capable of being used in the present invention. FIG. 16(A) is a hollow rotation shaft. FIG. 16(B) is a cross-sectional view obtained when FIG. 16(A) is seen from its side. FIG. 16(C) is a hollow stator vane capable of being used in the present invention. FIG. 16(D) is a cross-sectional view obtained when FIG. 16(C) is seen from its side. The types of structures used in the present invention are not limited as long as the conditions of the present invention are satisfied.

FIG. 17 shows a simplified diagram of an example of a case having a through-hole structure through which air passes, capable of being used in the present invention. In FIG. 17(A), the exhaust port side is gradually narrowed. FIG. 17(B) shows an example where the exhaust port side is quickly narrowed. In the figure, the rotor ring having a stator on the inside of the case also is shaped to run along the shape of the case. The types of a shape and a structure of the case and the rotor ring are not limited.

Figure 17C:
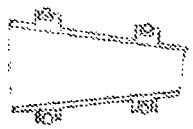
FIG. 17 shows an example of a simplified diagram of a case structure capable of being used in the present invention.

FIG. 17(C) shows an example of a simplified diagram of a cross-sectional part of a rotor ring at an outer side of the thrust generation device and a cross-sectional part of a case, where the side surface is of conical shape, and is shaped to be similar to (24F and 25F) and (24R and 25R) in FIG. 6.

There are various types of cases for compressor and cases for fan (fan case) of a conventional thrust generation device as described on page 179, etc., in Non Patent Document 3. There are various types of shapes, structures and materials of a case. These types are not limited as long as the conditions of the present invention are satisfied.

Figure 18A:
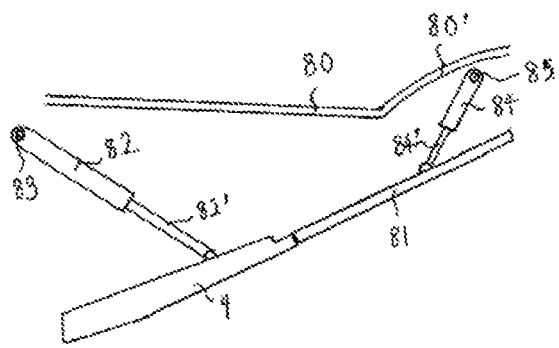
FIG. 18 shows an example of a simplified diagram of a rear structure of the vertical takeoff and landing transport plane according to claim 8 of the present invention.

FIG. 18 shows an example of a simplified diagram of a rear structure of the vertical takeoff and landing transport plane according to claim 8 of the present invention. FIG. 18(A) shows a cross-sectional view obtained when a "rear structure of an airframe, comprising a structure near a through-hole structure of an airframe rear part having a hole penetrating from the airframe bottom surface to the airframe top surface according to claim 1, positioned in a region in an airframe rear part from an area near a rear part of a main wing to an area near an elevator at a rear part of a horizontal tail of an airframe of the vertical takeoff and landing transport plane" according to claim 8 is seen from its side. Numeral (80) is the cross section of an exterior at an airframe top surface side. Numeral (4) is a lower-side door that opens/closes in a similar direction as that which is provided for a typical Osprey. Numeral (81) is an upper-side door that opens/closes in a similar direction as that which is provided for a typical Osprey. Numerals (82, 82') and (84, 84') denote an actuator. Numeral (82') is an actuator at the (4) side. Numeral (84') is an actuator at the (81) side. Numeral (83) is a rotation shaft at an actuator side having a rotation shaft for linkage with an airframe. Numeral (85) is a rotation shaft at an actuator side having a rotation shaft for linkage with an airframe.

Figure 18B:
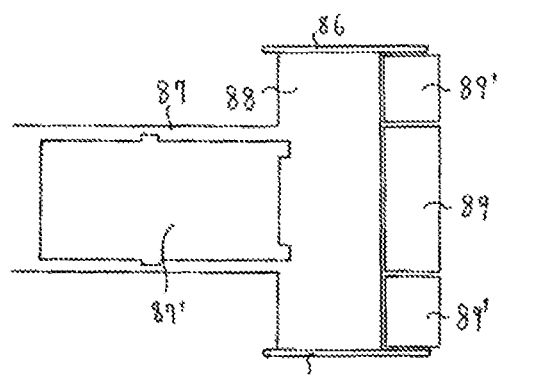

FIG. 18(B) is a simplified diagram obtained when an area near the structure of the airframe rear part in claim 8 is seen from below. Numeral (86) is a vertical stabilizer (described on page 23 in Non Patent Document 6) for a typical Osprey. Numeral (87) is a "rear structure of an airframe, comprising a structure near a through-hole structure of an airframe rear part having a hole penetrating from the airframe bottom surface to the airframe top surface according to claim 1" according to claim 8. Numeral (88) is a horizontal stabilizer. Numeral (87') is a "through-hole of an airframe rear part." (89, 89') are an elevator divided into three parts. Numeral (89) at the center and (89') on both sides with (89) being interposed therebetween can be independently operated.

Figure 18C:
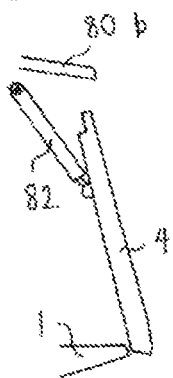

FIG. 18(C) is a simplified diagram showing the foregoing FIG. 18(A) operated according to claim 8 of the present invention. Numeral (4) linked by a hinge mechanism to the airframe (1) can be inclined closer toward the airframe internal direction than the upper through-hole, by (82) linked by the rotation shaft closer toward an operator seat than that of a typical Osprey. Further, in FIG. 18(A), numeral (81) is configured by doors (81a, 81b) which include a mechanism by which the doors themselves can be expanded and contracted in an arrow c direction as a result of (81b) sliding inside (81a). Numerals (81a) and (81b) are upper-side doors capable of performing a similar swing operation as in a typical Osprey, by (84, 84') attached to the airframe rear part.

Numerals (80a, 80b) in FIG. 18(C) denote an "opening/closing door for partitioning and blocking, from the airframe top surface, a through-hole" according to claim 8 configuring (80) in FIG. 18(A). Numerals (80'a, 80'b) denote an "opening/closing door for partitioning and blocking, from the airframe top surface, a through-hole" according to claim 8 configuring (80') in FIG. 18(A). A linkage part (90) for surrounding and sliding the door (80a) configuring an airframe top surface, which is a "sliding operation mechanism for sliding a door configuring the airframe top surface in a front-back direction of an aircraft" according to claim 8, is configured so that a "linkage part between said sliding operation mechanism and a door (80'a) configuring the airframe top surface positioned at the back of said sliding operation mechanism" according to claim 8 is linked by the rotation shaft, (80'a) and (80'b) are linked by the rotation shaft of "linkage part for the doors configuring the divided airframe top surface, positioned at the back of said linkage part" according to claim 8, (80'b) and (88) are linked by the rotation shaft, which is a "linkage part between the door configuring the airframe top surface and an area near a horizontal plate configuration part of an aircraft, positioned at said rear side" according to claim 8, (80) slides in an arrow "a" direction, and the linkage parts of (90 and 80'a), (80'a and 80'b), and (80'b and 88) perform a swing operation in an arrow "b" direction so as to serve a role as a "swing operation mechanism having a shaft parallel to a left-right direction line of an aircraft" according to claim 8. Thus, the figure shows an "opening/closing door for partitioning and blocking, from the airframe top surface, a through-hole by the same or approximately the same size as that of the through-hole in an airframe rear part" according to claim 8.

In FIG. 8(C), the center elevator (89) is configured so that (80'*a*) is less likely to directly receive a tailwind as a result of an elevator rear end falling into a front oblique upper direction. Further, (80*a*) may be provided with an expansion/contraction mechanism similar to (81*a*) and (81*b*).

The present invention has been configured in order to realize a specific effect only, and thus, the present invention does not intend to guarantee complete and perfect safety.

The embodiments of the present invention are as follows:
1. As long as the conditions of claims of the present invention are satisfied, the type of shape, the materials, and the structure are not limited.
2. As long as the conditions of claims of the present invention are satisfied, the types of a control device for operating a device according to a claim of the present invention including oil pressure, air pressure, a motor, a screw, a gear, etc., are not limited.
3. The type of a combination of the claims of the present invention with a device or an article having another effect or function is not limited.

DESCRIPTION OF REFERENCE NUMERALS

LX: front-back direction line of an aircraft, LY: left-right direction line of an aircraft, LZ: top-bottom direction line of an aircraft,
1: airframe, 1': area near elevator at rear part of horizontal tail, 2: propeller, 3: engine, 4: lower-side door, 4': hinge structure part, 5: airframe rear part constituent part, 5': hole penetrating from airframe bottom surface to airframe top surface, 6: space, 7: door, 8: robot arm, 9: box-shaped nacelle, 9': rotation shaft, 10: exhaust hole, 11: propeller, 12: electric motor, 12': leg for supporting motor, 13: thrust generation device, 13': protruded portion, 14/14': rotation shaft mechanism, 15: robot arm, 16: upper-side door, 17: guide for sliding, 18: rotation shaft or bearing, 19: blade of moving blade, 20: rotor ring, 21: magnet, 22: blade fixation part of tapered moving blade/rotation rotor, 23: blade, 24F/25F/24F'/25F': front bearing, 24R/25R/24R'/25R': rear bearing, 26: bearing, 27: conducting coil, 28: magnetic rotor, 29: rotation shaft, 30: case for supporting rotor on outer circumference of electric moving blade, 30F: front ring-shaped fixation part, 30R: rear ring-shaped fixation part, 31: structure capable of rolling bearing, 32: stator blade, 33: tube-shaped rotation rotor, 34: blade, 35: conducting coil, 36: magnetic rotor, 37: leg for supporting, IR/OR: compressor moving blade, SW: stator vane, Ca: case, 38: moving blade, 39: rotor coil, 40: stator blade, 41: linkage part, 42: ring-shaped rotation shaft, 43: box according to claim 3, 44: moving blade, 45/45'/45"/45'''/45'''': lid according to claim 5, 46: vertically penetrating hole, 46': hole from which air goes out, 47: rotation shaft linking lid according to claim 5 and box according to claim 3, 48: rotor for power generator, 48': gear box, 49/49' shaft, 50: power part for power generation, 51: deflection plate in exhaust direction, 52: air-intake duct, 52': duct for exhausting exhaust gas, 53: air duct for exhaust, 54: deflection plate of air duct for exhaust, 55/56: actuator, 57: plate for door, 58: rotation shaft, 59: rod, 60: cylinder, 60': rotation shaft, 61: rod support part, 61': rotation shaft, 62: thrust generation device of the present invention, 62': rotation ring, 63: through-port, 64: area near horizontal tail, 65: lid for covering opening, 66: linked part with arm according to claim 7, 67: wheel, 68: guide rail, 69: small-sized turbo shaft engine, 70: power transmission mechanism, 71: propeller part for generating thrust, 72: cover of thrust generation device, 73: member at airframe side, 74: member at door side, 75: rotation shaft, 76: hinge, 77: box-shaped nacelle, 78: deflection plate, 79: rotation shaft, 80: exterior at airframe top surface side, 81: upper-side door, 82/82'/84/84': actuator, 83/85: rotation shaft at actuator side, 86: vertical stabilizer, 87: airframe rear structure, 88: horizontal stabilizer, 87': through-hole of airframe rear part, 89/89': elevator, 80*a*/80'*a*/80'*b*: opening/closing door for partitioning and blocking through-hole according to claim 8 from airframe top surface, 81*a*, 81*b*: expanded/contracted door configuring 81, 90: guide for sliding 80*a*

What is claimed is:
1. A vertical takeoff and landing transport plane, wherein:
a line passing in a front-back direction of the vertical takeoff and landing transport plane defines a front-back direction line of the vertical takeoff and landing transport plane;
a line perpendicular to the front-back direction line of the vertical takeoff and landing transport plane and passing in a left-right direction of a main wing of the vertical takeoff and landing transport plane defines a left-right direction line of the vertical takeoff and landing transport plane; and
a line in a direction perpendicular to the front-back direction line of the vertical takeoff and landing transport plane and the left-right direction line of the vertical takeoff and landing transport plane defines a top-bottom direction line of the vertical takeoff and landing transport plane; and
wherein a rear fuselage portion and a tail part of the vertical takeoff and landing transport plane defines a rear part of the vertical takeoff and landing transport plane;
wherein the vertical takeoff and landing transport plane is capable of:
performing a forward movement while an engine linked to the main wing via a first rotation shaft is faced obliquely upward,
performing an operation in a vertical takeoff and landing mode when the engine linked to the main wing is faced upward, and
flying in a fixed wing mode when the engine linked to the main wing is faced forward; wherein
the rear part of the vertical takeoff and landing transport plane comprises:
a thrust generation device that exhausts air and is not directly fastened to the rear part; and
a through-hole that penetrates from a bottom surface to a top surface of the rear part, and into and out of which the thrust generation device is provided; wherein:
a linkage arm is housed between a portion of the rear part of the vertical takeoff and landing transport plane and the thrust generation device within the through-hole, the linkage arm linked at a first end to the portion of the rear part of the vertical takeoff and landing transport plane, and linked at a second end, that is opposite from the first end, to the thrust generation device;
the first end of the linkage arm and the portion of the rear part of the vertical takeoff and landing transport plane are linked via a second rotation shaft that is parallel or substantially parallel to the left-right direction line of the vertical takeoff and landing transport plane;

the second end of the linkage arm and the thrust generation device are linked via a third rotation shaft that is parallel or substantially parallel to the left-right direction line of the vertical takeoff and landing transport plane;

the linkage arm expands and contracts; and the thrust generation device linked to the linkage arm can be moved in its entirety to a position above the top surface of the rear part of the vertical takeoff and landing transport plane.

2. A vertical takeoff and landing transport plane, wherein:

a line passing in a front-back direction of the vertical takeoff and landing transport plane defines a front-back direction line of the vertical takeoff and landing transport plane;

a line perpendicular to the front-back direction line of the vertical takeoff and landing transport plane and passing in a left-right direction of a main wing of the vertical takeoff and landing transport plane defines a left-right direction line of the vertical takeoff and landing transport plane; and a line in a direction perpendicular to the front-back direction line of the vertical takeoff and landing transport plane and the left-right direction line of the vertical takeoff and landing transport plane defines a top-bottom direction line of the vertical takeoff and landing transport plane; and wherein a rear fuselage portion and a tail part of the vertical takeoff and landing transport plane defines a rear part of the vertical takeoff and landing transport plane;

wherein the vertical takeoff and landing transport plane is capable of:

performing a forward movement while an engine linked to the main wing via a first rotation shaft is faced obliquely upward, performing an operation in a vertical takeoff and landing mode when the engine linked to the main wing is faced upward, and flying in a fixed wing mode when the engine linked to the main wing is faced forward; wherein the rear part of the vertical takeoff and landing transport plane comprises:

a thrust generation device that exhausts air and is not directly fastened to the rear part; and a through-hole that penetrates from a bottom surface to a top surface of the rear part, and into and out of which the thrust generation device is provided; wherein:

a linkage arm is housed between a portion of the rear part of the vertical takeoff and landing transport plane and the thrust generation device within the through-hole, the linkage arm linked at a first end to the portion of the rear part of the vertical takeoff and landing transport plane, and linked at a second end, that is opposite from the first end, to the thrust generation device;

the first end of the linkage arm and the portion of the rear part of the vertical takeoff and landing transport plane are linked via a second rotation shaft that is parallel or substantially parallel to the left-right direction line of the vertical takeoff and landing transport plane;

the second end of the linkage arm and the thrust generation device are linked via a third rotation shaft that is parallel or substantially parallel to the left-right direction line of the vertical takeoff and landing transport plane;

the linkage arm does not expand or contract; and the thrust generation device linked to the linkage arm can be moved in its entirety to a position above the top surface of the rear part of the vertical takeoff and landing transport plane.

* * * * *